(12) United States Patent
Vadlamani et al.

(10) Patent No.: US 12,552,842 B2
(45) Date of Patent: Feb. 17, 2026

(54) ALKALIPHILIC CONSORTIUM SHIFTING FOR PRODUCTION OF PHYCOCYANINS AND BIOCHEMICALS

(71) Applicant: Synergia Biotech Inc., Calgary (CA)

(72) Inventors: Agasteswar Vadlamani, Calgary (CA); Cigdem Demirkaya, Calgary (CA); Jacqueline Zorz, Calgary (CA); Hector De La Hoz Siegler, Calgary (CA); Marc Strous, Alberta (CA)

(73) Assignee: Synergia Biotech Inc., Calgary (CA)

( * ) Notice: Subject to any disclaimer, the term of this patent is extended or adjusted under 35 U.S.C. 154(b) by 741 days.

(21) Appl. No.: 17/778,978

(22) PCT Filed: Nov. 24, 2020

(86) PCT No.: PCT/CA2020/051600
§ 371 (c)(1),
(2) Date: May 23, 2022

(87) PCT Pub. No.: WO2021/102563
PCT Pub. Date: Jun. 3, 2021

(65) Prior Publication Data
US 2023/0009188 A1    Jan. 12, 2023

Related U.S. Application Data

(60) Provisional application No. 62/940,626, filed on Nov. 26, 2019.

(51) Int. Cl.
*C07K 14/195* (2006.01)
*C12N 1/20* (2006.01)

(52) U.S. Cl.
CPC .............. *C07K 14/195* (2013.01); *C12N 1/20* (2013.01)

(58) Field of Classification Search
None
See application file for complete search history.

(56) References Cited

U.S. PATENT DOCUMENTS

2017/0313972 A1*  11/2017  Pendyala .................. C10L 1/02

FOREIGN PATENT DOCUMENTS

| CA | 2957296 | 8/2017 |
|---|---|---|
| WO | WO 2015/110844 | 7/2015 |
| WO | WO 2017/191078 | 11/2017 |
| WO | WO 2018/033814 | 2/2018 |
| WO | WO 2018/200811 | 11/2018 |
| WO | WO 2018/203211 A1 | 11/2018 |
| WO | WO 2019/193614 | 10/2019 |

OTHER PUBLICATIONS

Mubarak, M; et al. "Flocculation: An effective way to harvest microalgae for biodiesel production", Journal of Environmental Chemical Engineering, vol. 7, Issue 4, Aug. 2019, https://doi.org/10.1016/j.jece.2019.103221. (Year: 2019).*

Purohit, A; et al. "Processing-Independent Extracellular Production of High Purity C-Phycocyanin from Spirulina platensis." ACS Biomater. Sci. Eng., Jun. 12, 2019, vol. 5(7), pp. 3237-3245, doi:10.1.021/acsbiomaterials.9b00370, ISSN: 2373-9878. (Year: 2019).*

Daelman MR, Sorokin D, Kruse O, van Loosdrecht MC, Strous M. Haloalkaline bioconversions for methane production from microalgae grown on sunlight. Trends in biotechnology. Jun. 1, 2016;34(6):450-7. (Year: 2016).*

Vernes L, Granvillain P, Chemat F, Vian M. Phycocyanin from Arthrospira platensis. Production, extraction and analysis. Current Biotechnology. Nov. 1, 2015;4(4):481-91. (Year: 2015).*

Sharp CE, Urschel S, Dong X, Brady AL, Slater GF, Strous M. Robust, high-productivity phototrophic carbon capture at high pH and alkalinity using natural microbial communities. Biotechnology for Biofuels. Dec. 2017;10:1-3 (Year: 2017).*

Ataeian, Maryam and Vadlamani, Agasteswar and Haines, Marianne and Mosier, Damon and Dong, Xiaoli and Kleiner, Manuel and Strous, Marc and Hawley, Alyse, Whole Genome Sequence and Experimental Proteome of Candidatus 'Phormidium Alkaliphilum', an Abundant and Widespread Cyanobacterium With Applications in Biotechnology. 2021. Available at SSRN: https://ssrn.com/abstract=3858915 or http://dx.doi.org/10.2139/ssrn.3858915.

Ataeian, M., Vadlamani, A., Haines, M., Mosier, D., Dong, X., Kleiner, M., . . . & Hawley, A. K. (2021). Proteome and strain analysis of cyanobacterium Candidatus "Phormidium alkaliphilum" reveals traits for success in biotechnology. *Iscience*, 24(12), 103405.

Ataeian, M et al. Direct capture and conversion of COs from air by growing a cyanobacterial consortium at pH up to 11.2. Biotechnology and Bioengineering, Mar. 24, 2019 (Mar. 24, 2019), vol. 116(7), pp. 1604-1611, doi: 10.1002/bit.26974, ISSN: 1097-0290 (online).

Boros E, Kolpakova M (2018) "A review of the defining chemical properties of soda lakes and pans: An assessment on a large geographic scale of Eurasian inland saline surface waters." PLoS ONE 13(8): e0202205.

Deshmukh, DV and Puranik, PR. Statistical Evaluation of Nutritional Components Impacting Phycocyanin Production in *Synechocystic* Sp. Brazilian Journal of Microbiology, 2012, vol. 43(1), pp. 348-355, doi:10.1590/S1517-83822012000100041, ISSN: 1517-8382.

Foulds and Carr (1977) "A Proteolytic Enzyme Degrading Phycocyanin in the Cyanobacterium Anabaena Cylindrica" FEMS Microbiology Letters 2: 117-119.

Hsieh-Lo, Met at Phycocyanin and phycoerythrin : Strategies to improve production yield and chemical stability. Algal Research, Sep. 2019 (Sep. 2019), vol. 42, pp. 1-11, doi:10.1016/j.alga1.2019.101600, ISSN: 2211-9264.

International Search Report and Written Opinion dated Feb. 2, 2021.

(Continued)

*Primary Examiner* — Jennifer M.H. Tichy
*Assistant Examiner* — Emily F Eix
(74) *Attorney, Agent, or Firm* — Darya C. Cheng; Bret E. Field; Bozicevic, Field & Francis LLP

(57) ABSTRACT

Processes are disclosed for photosynthetic cyanobacterial production of selected proteins and biochemicals within an evolving alkaliphilic microbial consortium.

19 Claims, 9 Drawing Sheets

(56) References Cited

OTHER PUBLICATIONS

Khan, MI et al. The promising future of microalgae: current status, challenges, and optimization of a sustainable and renewable industry for biofuels, feed, and other products. Microb Cell Fact, 2018, vol. 17(36), pp. 1-21, doi: 10.1186/s12934-018-0879-x, ISSN: 1475-2859.

Kuddus M, Singh P, Thomas G, Al-Hazimi A (2013). "Recent developments in production and biotechnological applications of C-phycocyanin". BioMed Research International. 2013.

Moezelaar, R et al. Fermentation and Sulfur Reduction in the Mat-Building Cyanobacterium Microcoleus chthonoplastes. Applied And Environmental Microbiology, May 1996 (May 1996), vol. 62(5), pp. 1752-1758, doi: 10.1128/aem.62.5.1752-1758.1996, ISSN: 1098-5336 (online).

Pagels, Guedes, Amaro, Kijjoa, Vasconcelos (2019) "Phycobiliproteins from cyanobacteria: Chemistry and biotechnological applications." .Biotechnol Adv. May-Jun. 2019;37(3):422-443. Epub Feb. 21, 2019.

Purohit, A et al. Processing-Independent Extracellular Production of High Purity C-Phycocyanin from Spirulina platensis. ACS Biomater. Sci. Eng., Jun. 12, 2019 (Jun. 12, 2019), vol. 5(7), pp. 3237-3245, doi:10.1021/acsbiomaterials.9b00370, ISSN: 2373-9878 (online).

Sharp, CE et al. Robust, high-productivity phototrophic carbon capture at high pH and alkalinity using natural microbial communities. Biotechnol Biofuels, Mar. 29, 2017 (Mar. 29, 2017), vol. 10(84), pp. 1-13, doi: 10.1186/s13068-017-0769-1, ISSN: 1754-6834.

Sorokin, Gijs Kuenen (2005) "Chemolithotrophic haloalkaliphiles from soda lakes" FEMS Microbiology Ecology, vol. 52, Issue 3, May 2005, pp. 287-295.

University of Calgary. Cost Effective Bioenergy for CO2 Conversion. Nov. 4, 2019 (Nov. 4, 2019), [online] [retrieved on Jan. 13, 2021 (Jan. 13, 2021)]. Retrieved from the internet: <https://research.ucalgary.ca/sites/defaulUfiles/Energy/2019%20Bioenergy%20FINAL.pdf>.

Vavourakis, C.D., Andrei, AS., Mehrshad, M et al. A metagenomics roadmap to the uncultured genome diversity in hypersaline soda lake sediments. Microbiome 6, 168 (2018). https://doi.org/10.1186/s40168-018-0548-7.

Zorz, JK et al. A shared core microbiome in soda lakes separated by large distances. Nature Communications, Sep. 17, 2019 (Sep. 17, 2019), vol. 10(4230), pp. 1-10, doi: 10.1038/s41467-019-12195-5, ISSN: 2041-1723 (online).

\* cited by examiner

ALKALIPHILIC CONSORTIUM SHIFTING FOR PRODUCTION OF PHYCOCYANINS AND BIOCHEMICALS

FIELD

Innovations are disclosed in the field of industrial microbiology, particularly the photosynthetic cyanobacterial production of selected proteins and biochemicals within an evolving alkaliphilic microbial consortium.

BACKGROUND

Cyanobacterial cultivation systems have been proposed as alternatives to petrochemical systems for the production of a range of valuable organic products (see CA2957296). These products include organic acid feedstocks, such as succinic and acetic acids, as well as more complex peptide products. One such peptide product is phycocyanin, a phycobiliprotein that is a deep and intense blue-colored, fluorescent, water-soluble protein component of the photosynthetic light-harvesting antenna complex of cyanobacteria (bluegreen algae). The phycocyanins include C-phycocyanin (C-PC), R-phycocyanin (R-PC), and allophycocyanin, which are each assembled into an organized cellular structure called the phycobilisome, which is attached to the external surface of the thylakoid membrane in cyanobacteria, where they act as major light harvesting pigments. Phycocyanin alpha and beta monomers assemble into functional trimers $(\alpha\beta)_3$, that in turn aggregate to form hexamers. As used herein, the term "phycocyanin" refers collectively to all of these phycocyanin entities, from monomeric polypeptides to the assembled aggregates.

Phycocyanins, primarily C-phycocyanin, have been attributed with a wide range of beneficial properties, including anti-oxidative therapeutic activity, anti-inflammatory activity and anti-cancer efficacy (see WO2019193614 and WO2017191078). Beyond uses in human health, because of its intense blue color, phycocyanin has gained importance as a dye in cosmetic and food industries (see WO2015110844).

A wide variety of photosynthetic microbial cultivation systems are known, many of which alternate periods of light and dark. It has for example been suggested that exposing algal cultures to periods of darkness may be beneficial to allow the culture to regenerate and repair cellular components (see WO2018203211). Nevertheless, current technologies associated with extraction and purification of phycocyanin require multiple unit operations, as for example described in WO2018200811, WO2018033814, Kuddus et al., 2013 and Pegels et al., 2019. These unit operations may be both capital and energy intensive, and may be subject to unpredictable outcomes inherent to biological production systems. It has for example been reported that phycocyanin is degraded by a proteolytic enzyme during maintenance of a cyanobacterial culture in the dark (Foulds 1977). There remains a need for effective methods to produce, extract and purify phycocyanin and other biochemical products.

Soda lakes are a distinctive natural cyanobacterial environment that occurs in a wide range of locations across the globe. Brackish and saline alkaline lakes and pans, referred to collectively herein as "soda lakes", are evaporative, athallasic salt lakes with low calcium and magnesium concentrations and a high-alkaline pH, typically in excess of 9 and for example up to 11. Sodium (Na$^+$) and carbonate species (HCO$_3^+$CO$_3^{2-}$) are the dominant ions in soda-lake waters, which also commonly have high concentrations of chloride, variable concentrations of sulfate and potassium, and very low concentrations of alkaline earths (due to the equilibrium state with carbonate minerals such as calcite, high-magnesium calcite and strontianite). The alkaline pH is accordingly buffered by dissolved bicarbonate and carbonate ions (the low calcium and magnesium concentrations permit the high concentrations of (bi)carbonate). The high pH, alkalinity, and high sodium salinity of these environments dictates that the microorganisms that reside in soda lakes are consortia of extremophiles.

By virtue of the fact that soda-lake formation depends on low levels of dissolved calcium and magnesium, as well as on the dominance of bicarbonate (HCO$_3^-$>>Ca$^{2+}$+Mg$^{2+}$), they represent some of the most stable high-pH environments (pH>9) in the world (Boros & Kolpakova, 2018). This stability is reflected in metagenome-assembled-genome sequences (MAGs) that have revealed the complex and yet consistent makeup of the core microbiome of these exceptionally productive phototrophic microbial communities, with soda lakes separated even by very large distances being characterized by a shared core microbiome (Zorz et al., 2019).

SUMMARY

Methods are provided for making a phycocyanin product, involving culturing an alkaliphilic soda lake microbial consortium (i.e. a microbial consortium capable of growth in an alkaline soda lake). The microbial consortium is first cultured under aerobic alkaline conditions in a diurnal (light phase) growth cycle, to establish a cyanobacterial population containing the phycocyanin within the microbial consortium in a cultured biomass in an aerobic culture. The microbial consortium may then be shifted to a dark-phase cycle under anaerobic alkaline conditions in an anaerobic culture, so as to initiate auto-catabolic release of the phycocyanin intact from the cyanobacterial population. Before shifting to the dark-phase cycle, the microbial consortium may concentrated, for example by being allowed to settle/float, thereby separating the cultured biomass from the growth medium, to form a concentrated biomass for the dark-phase cycle. At this stage, dewatering to separate the cultured biomass from the growth medium may also make use of a filtration step, for example filtration with a filter mesh of from about 100 to about 635 mesh, such as a 500 mesh (20 micron) filter. The release of phycocyanin takes place as the proportion of cyanobacteria in the microbial consortium decreases and the proportion of non-cyanobacterial alkaliphile microbes increases in the consortium. The result is the production of a biomass solids product and an aqueous phycocyanin product. In select embodiments, the yield of the phycocyanin phycocyanin product may for example be as much as at least 2 wt % of the biomass yield.

In select embodiments, methods are accordingly provided for extraction and purification of phycocyanin from a wet slurry of cyanobacterial consortium. In one aspect, the method comprises: (a) cultivation of cyanobacterial consortium (for example using methods as disclosed in CA2957296). This may for example involve cultivation in a culture medium comprising: (i) nutrients for supporting microbial growth and/or metabolism, (ii) at least 0.5 mol/L aqueous (bi)carbonate, (iii) a redox buffer in the form of a nitrate or a dissolved iron, and (iv) having a pH≥9. Following cultivation in step (a), the method may involve: (b) increasing the concentration of algae (for example to 10-20% solids), for example by settling, (c) subjecting the concentrated slurry to a dark-phase bio-conversion process, wherein, the cyanobacterial consortium will breakdown on its own in an anaerobic or anoxic auto-catabolic process, to release phycocyanin. The phycocyanin may for example comprise at least 10, 11, 12, 13, 14, 15, 16, 17 or 18% (w/w) of total protein content. The method may simultaneously produce organic acids and/or other water soluble products such as sucrose, trehalose, and glucosylglycerol). The method may further involve: d) separation of extract (containing phycocyanin and organic acids) from residual biomass and, finally (e) separation of a phycocyanin product, for example by separation from organic acids. These separations may for example involve filtration, for example molecular weight cut-off filters in the range of 10-30 kDa can be used to purify phycocyanin. Molecular weight cut-off refers to the lowest molecular weight solute that can be retained on the membrane (usually >90%). These membranes can be made up of either polyethersulfone (PES) or hydrosart Methods are accordingly provided for making a phycocyanin product, comprising: culturing an alkaliphilic soda lake microbial consortium under aerobic alkaline conditions in a diurnal growth cycle to establish a cyanobacterial population containing the phycocyanin within the microbial consortium in a cultured biomass in an aerobic culture; and, shifting the microbial consortium to a dark-phase cycle under anaerobic alkaline conditions in an anaerobic culture to initiate auto-catabolic release of the phycocyanin intact from the cyanobacterial population as the proportion of cyanobacteria in the microbial consortium decreases and the proportion of non-cyanobacterial alkaliphile microbes increases in the consortium, to produce a biomass solids product and an aqueous phycocyanin product.

The aerobic and/or anaerobic alkaline conditions may for example be characterized by one or more of the following characteristics: at least 0.5M Na+, or from 0.25M-3M Na$^+$; at least 0.5M total carbonate alkalinity ($CO_3^{2-}$+$HCO_3^-$), or from 0.25M-1M total carbonate alkalinity; a pH of at least 9, or from 7-11; one or more dissolved species that are: $Na_2CO_3$ (e.g. 200-215 mM, or about 210.98 mM), $NaHCO_3$ (70-90 mM or 77 about 0.85 mM), $NaNO_3$ (2-4 mM, or about 3.06 mM), $NH_4$ (1-2 mM or about 0.92 mM), $KH_2PO_4$, (1-2 mM or about 1.44 mM), $MgSO_4 \cdot 7H_2O$ (0.5-1.5 mM, or about 1 mM), $CaCl_2 \cdot 2H_2O$ (0.1-2 mM, or about 0.17 mM), NaCl (0.3-0.5 mM, or about 0.43 mM), KCl (5.5-6.5 mM, or about 6.04 mM) $FeCl_3 \cdot 6H_2O$ (0.01-0.06 mM, or about mM0.04 mM), $H_3BO_3$ (trace), $MnCl_2 \cdot 4H_2O$ (trace), $ZnCl_2$ (trace), $CuCl_2 \cdot 2H_2O$ (trace), $Na_2MoO_4 \cdot 2H_2O$ (trace), $CoCl_2 \cdot 6H_2O$ (trace), $NiCl_2 \cdot 6H_2O$ (trace), and/or KBr (trace).

The aerobic alkaline conditions may for example comprise an oxygen partial pressure of at least 200 mbar or at least 9 mg/L, and/or exposure to air.

The anaerobic alkaline conditions may for example comprise an oxygen partial pressure of less than 100, 90, 80, 70, 60, 50, 40, 30, 20 or 10 mbar or less than 4, 3, 2, 1, 0.5, or 0.1 mg/L, and/or exclusion of air.

The aerobic and/or anaerobic alkaline conditions may for example comprise a temperature of from 4 to 45° C. or 10° C. to 30° C.

The diurnal cycle for cultivation may for example be maintained for a light phase incubation time that is at least 1, 2, 3, 4, 5 or 6 days, or from 1-12 days. Similarly, the dark phase cycle for phycocyanin production may for example be maintained for a dark phase incubation time that is at least 1, 2, 3, 4, 5 or 6 days, or from 1 to 12 days. The diurnal cycle may involve exposure of the microbial consortium to full spectrum sunlight or artificial light that covers the full visible spectrum range, for example at a light intensity of at least 200 μmol. photons/m$^2$/s with a light:dark cycle of approximately 16:8 hr (or for a light cycle in the range of 9-16 hr and for a dark cycle in the range of 8-15 hr).

The cultured biomass may be allowed to either settle or float prior to shifting the microbial consortium to the dark-phase cycle to provide a concentrated biomass for the dark-phase cycle. The concentrated biomass may for example have a concentration of at least 10, 11, 12, 13, 14, 15, 16, 17, 18 or 19% in the anaerobic culture (biomass solid weight/total anaerobic culture weight) under the anaerobic alkaline conditions. The microbial consortium may include a *phormidium*, NCBI #REDN00000000.1 (a species closely related to *Phormidium lacuna* and *Phormidium* OSCR.), and/or a *planctomycetota*, and/or one or more of: *Nodosilinea*, Gloeocapsa, *Phormidium*, Spriulina, Rhodobacteraceae, Gemmatimonadota; SG8-23, Chromatiaceae, *Natronohydrobacter*, Geminicoccales, *Nodosilinea*, Cyanobium, *Wenzhouxiangella*, Indibacter, Competibacteraceae, Nitriliruptoraceae, *Desulfonatronum*, or Thioalkalivibrionaceae. The alkaliphile microbial community may for example comprise, in addition to cyanobacteria (cyanobacteriota), alkaliphiles such as: proteobacteria, planctomycetes (heterotypic synonyms: planctomycetaeota and *planctomycetota*). Alternatively, the alkaliphile community may comprise one or more members of the following taxa: Cyanobacteriota, Phormidesmiales, Gemmatimonadota, Proteobacteria, Alphaproteobacteria, Gammaproteobacteria, Bacteroidetes, or Spirochaetota. Alternatively the alkaliphile community may comprise one or more members of the following taxa: *Roseinatronobacter, Natronohydrobacter*, Rhodobacteraceae, Rhodobacteraceae, Salinarimonas, Geminicoccales, Rhodospirillales, Micavibrionales, *Wenzhouxiangella*, Thioalkalivibrionaceae, *Ectothiorhodospira*, Gammaproteobacteria, *Thiohalocapsa*, Competibacteraceae, *Halomonas, Nitrincola*, Pseudomonadales, *Pseudomonas* "D", Hahellaceae, *Desulfonatronum*, Bdellovibrionota (family UBA2394), Myxococcota (family CA-2862545), Myxococcota (order UBA4248), Bacteroidales (family UBA7960), Bacteroidales (family UBA12077), Saprospiraceae, Chitinophagales (family UBA2359), Flavobacteriales, Schleiferia, Indibacter, Balneolaceae (genus UBA2664), Balneolaceae, Balneolales, *Alkalispirochaeta*, Alkalispirochaetaceae, Spirochaetales, Pirellulaceae (genus UBA6163), Pirellulaceae, Phycisphaerales (family SM1A02), Phycisphaerales (family SM1A02), *Planctomycetota* (family UBA11346), Opitutaceae, Puniceicoccaceae (genus BACL24), *Nitrolancea* (genus), Anaerolineae (genus GCA-2794505), llumatobacteraceae, Nitriliruptoraceae, Trueperaceae, Acholeplasmataceae, lzimaplasmataceae, *Alkalibacterium, Bacillus* "AQ", *Nodosilinea*, Phormidesmiaceae, *Arthrospira platensis, Phormidium* (A), Nodularia, Cyanobium, Gloeocapsa, *Spirulina*, Gemmatimonadota (order SG8-23), and/or *Nodosilinea*.

The yield of the phycocyanin product may for example be at least 0.5, 1, 1.5 and up to 10 wt % of the biomass solids product yield. Carbon dioxide produced during bio-conversion may for example be used as an inorganic carbon source for the microbial consortium cultivation process, and residual solids after bio-conversion may for example be re-cycled back to the microbial consortium cultivation process. Similarly, organic acids and other products may be used to cultivate the microbial consortium mixotrophically. Alternatively, residual solids and other compounds such as organic acids may be used to produce methane.

Alternatively the alkaliphile community may comprise one or more members of taxa from one or more soda lakes in British Columbia, Canada, such as: Last Chance Lake, Deer Lake, Goodenough Lake or Probe Lake. The total alkalinity in these lakes is generally between 0.20-0.65 mol $L^{-1}$, at pH 10.1-10.7. The core alkaliphile community in the BC lakes has been found to be similar to the core microbiome of the Kulunda steppe, Altai (Russia) soda lakes (Zorz et al., 2019; Vavourakis et al, 2018), which are characterized by total salts 20-380 g $L^{-1}$, pH 9.3-10.6, and total carbonate alkalinity 0.02-5.20M (Sorokin, 2005). Accordingly, the alkaliphile community may comprise one or more members of taxa from one or more Kulunda Steppe soda lakes in Central Asia. Alternatively the alkaliphile community may comprise one or more members of taxa from one or more soda lakes listed in Table 2. The Kenyan-Tanzanian section of the Rift Valley contains a number of alkaline soda lakes with a range of total salinities from around 5% (w/v) in the more dilute lakes (e.g. Elmenteita, Bogoria, Nakuru), to saturation (30% or greater) in parts of lakes Magadi, Little Magadi (Nasikie Engida) and Natron. These lakes are devoid of significant amounts of $Ca^{2+}$ and $Mg^{2+}$ and have pH values in the range from 9 to above 11.5 in the most concentrated lakes. Alternatively, in select embodiments the alkalphile community may be comprised of organisms capable of living in environments having the characteristics of any of these soda lakes.

TABLE 2

List of Soda Lakes

| Continent | Name | Country | pH | Salinity |
|---|---|---|---|---|
| Africa | Wadi El Natrun lakes | Egypt | 9.5 | 5% |
| | Malha Crater Lake | Sudan | 9.5-10.3 | NA |
| | Lake Arenguadi (Green Lake) | Ethiopia | 9.5-9.9 | 0.25% |
| | Lake Basaka | Ethiopia | 9.6 | 0.3% |
| | Lake Shala | Ethiopia | 9.8 | 1.8% |
| | Lake Chitu | Ethiopia | 10.3 | 5.8% |
| | Lake Abijatta | Ethiopia | 9.9 | 3.4% |
| | Lake Magadi | Kenya | 10 | >10% |
| | Lake Bogoria | Kenya | 10.5 | 35% |
| | Lake Turkana | Kenya | 8.5-9.2 | 0.25% |
| | Lake Nakuru | Kenya | 10.5 | NA |
| | Lake Logipi | Kenya | 9.5-10.5 | 12-5% |
| | Lake Sonachi (Crater Lake) | Kenya | NA | NA |
| | Lake Balangida | Tanzania | NA | NA |
| | Lake Manyara | Tanzania | 9.5-10 | NA |
| | Lake Natron | Tanzania | 9-10.5 | >10% |
| | Lake Rukwa | Tanzania | 8-9 | NA |
| | Lake Eyasi | Tanzania | 9.3 | 0.5% |
| | Momela Lakes | Tanzania | 9.7 | 22% |
| | Lake Ngami | Botswana | | |
| | Rombou Lake | Chad | 10.2 | 2% |
| Asia | Kulunda Steppe Lakes | Russia | NA | NA |
| | Lake Khatyn | Russia | 10 | NA |
| | Lake Van | Turkey | 9.7-9.8 | 2.3% |
| | Lake Salda | Turkey | NA | NA |
| | Lonar Lake (Crater Lake) | India | 9.5-10.5 | 1% |
| | Sambhar Salt Lake | India | 9.5 | 7% |
| | Khyagar Lake | India | 9.5 | 0.6% |
| | Tso Moriri Salt Lake | India | 9.0 | NA |
| | Tso Kar Salt Lake | India | 8.8 | NA |
| | Lake Surigh Yilganing Kol | India/China | NA | NA |
| | Tso Tang Lake | India/China | NA | NA |
| | Aksayqin Hu Lake | India/China | NA | NA |
| | Lake Hongshan Hu | India/China | NA | NA |
| | Tianshuihai lake | India/China | NA | NA |
| | North Tianshuihai lake | India/China | NA | NA |
| | Kushul lake | India | NA | NA |

TABLE 2-continued

List of Soda Lakes

| Continent | Name | Country | pH | Salinity |
|---|---|---|---|---|
| | Pangong Salt Lake | India & China | 9.4 | 0.9% |
| | Spanggur Tso (Pongur Tso) | India & China | NA | NA |
| | Guozha lake | China | NA | NA |
| | Qinghai Lake | China | 9.3 | 2.2% |
| | Namucuo Lake | India | 9.4 | 0.2% |
| | Lake Zabuye (Drangyer) | China | 10 | NA |
| | Taboos-nor | Mongolia | NA | NA |
| Europe | Lake Feher (Szeged) | Hungary | NA | NA |
| | Böddi-szék | Hungary | 8.8-9.8 | NA |
| | Lake Neusiedl (Fertő) | Austria, Hungary | 9-9.3 | NA |
| | Rusanda | Serbia | 9.3 | NA |
| | Kelemen-szék | Hungary | 9-9.7 | NA |
| North America | Mono Lake | US | 9.8 | 8% |
| | Soda Lakes (Nevada) | US | 9.7 | NA |
| | Soap Lake | US | 9.7 | 0.7% |
| | Baldwin Lake | US | NA | NA |
| | Alkali Lake (OR) | US | 11 | NA |
| | Summer Lake | US | NA | NA |
| | Owens Lake | US | NA | NA |
| | Borax Lake | US | NA | NA |
| | Manitou Lake | Canada | NA | NA |
| | Goodenough Lake | Canada | 10.2 | NA |
| | Lake Texcoco | Mexico | 8.8-11.5 | 8% |
| | Lake Alchichica | Mexico | 8.9 | NA |
| South America | Antofagasta Lake | Chile | NA | NA |
| Australia | Lake Werowrap | Australia | 9.8 | 4% |

In select embodiments, spent growth medium obtained after the settling process (containing nutrients), may be recycled back to cultivation system. In select embodiments, carbon dioxide released during the dark-phase bio-conversion process may be used to supply carbon to the cultivation system. In certain embodiments, residual biomass (which may be rich in nitrogen and phosphorous) may be supplied back to the cultivation system. In particular embodiments, the phycocyanin extract obtained after the dark-phase bio-conversion process may be subjected to drying to obtain phycocyanin powder. In certain embodiments, additional purification steps may be employed to obtain a purified phycocyanin. In certain embodiments, further separating and/or processing may for example comprise subjecting a purified phycocyanin extract to a drying process to obtain a phycocyanin powder.

Methods are also provided for biologically producing biochemicals, such as succinic acid, acetic acid, formic acid, propionic acid and/or butyric acid (examples of compounds collectively referred to herein as "organic acids"). In select embodiments, a significant fraction of the carbon present in the biomass (for example between 5 and 30 wt %) may be converted into organic acids. The organics acid products may for example be used for natural gas production via anaerobic digestion.

Methods for recovering organic acids from the aqueous fermentation medium may for example include a liquid-liquid extraction, for example using a high molecular weight alcohol, an ether, a ketone, or an ester as solvent. These recovery methods may also include subsequent distillation processes, for example to recover the solvent. In certain embodiments, the solvents used for recovering the organic acids from the aqueous fermentation medium may be low boiling point solvents with a high partition coefficient (>5) towards the organic acids (e.g. C2-C4 molecules), a low enthalpy of vaporization, and low solubility in water. MTBE, MIPK, TAME, and iso-amyl alcohol are some exemplary solvents which have both a high partition coefficient and a low enthalpy of vaporization.

TABLE 1

| Taxonomy | |
| --- | --- |
| Code | Taxonomy |
| A1 | Proteobacteria: Rhodobacteraceae (f) |
| A3 | Proteobacteria: Rhodobacteraceae (f) |
| A4 | Proteobacteria: Salinarimonas (g) |
| C1 | Cyanobacteria: Phormidium (g) |
| F1 | Firmicutes: Alkalibacterium (g) |
| G1 | Proteobacteria: Wenzhouxiangella (g) |
| G6 | Proteobacteria: Alkalimonas (g) |
| P1 | Planctomycetota: SM1A02 (f) |
| V1 | Verrucomicrobiota: UBA6053 (f) |
| V2 | Verrucomicrobiota: UBA6053 (f) |
| V3 | Verrucomicrobiota: Opitutales (o) |

Figure 12:
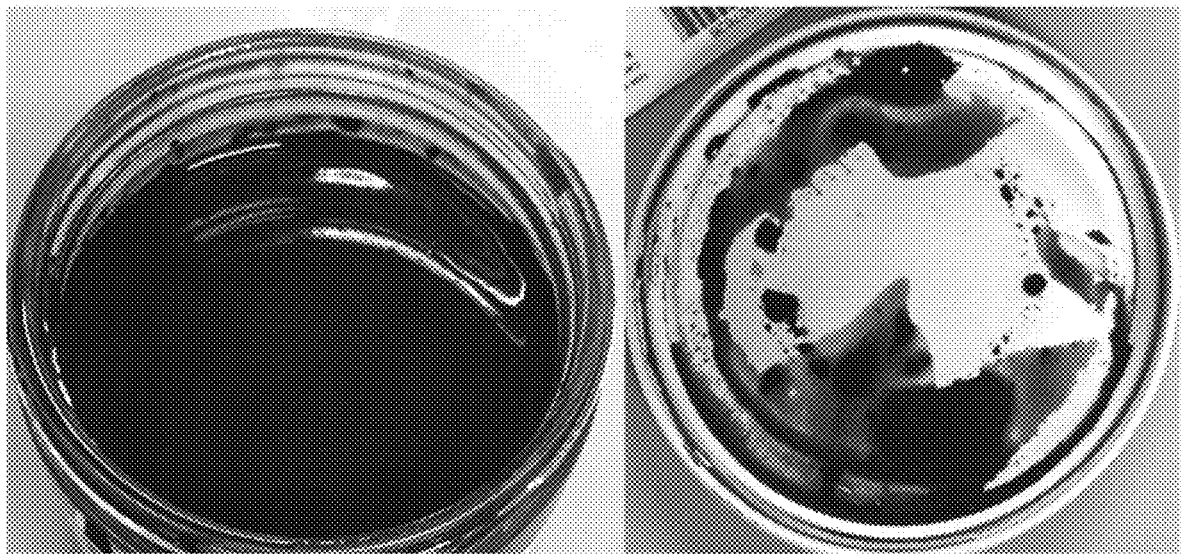

FIG. 12 includes two photographs showing phycocyanin passively released during a dark-phase incubation of *Arthrospira plantensis*.

DETAILED DESCRIPTION

In the context of the present disclosure, various technical terms are used in accordance with definitions that are commonly understood in the art, as follows. "Total carbonate alkalinity" is calculated as the sum of the concentrations of bicarbonates and carbonates. Alkaliphilic microorganisms are defined as organisms which exhibit optimum growth in an alkaline pH environment, particularly in excess of pH 8, and generally in the range between pH 9 and 10. Alkaliphiles may also be found living in environments having a pH as high as 12. Obligate alkaliphiles are incapable of growth at neutral pH. Halophilic bacteria are microorganisms that grow optimally in the presence of salt (sodium chloride), for example microorganisms having a minimum requirement in excess of the concentration found in sea water (ca. 0.5 M or 3%). The term "haloalkaliphile" may be used to describe bacteria that are both halophilic and alkaliphilic (see for example U.S. Pat. Nos. 6,420,147 and 6,291,229). The "soda lake" environments, which host many haloalkaliphiles, are characterized by relatively high total carbonate alkalinities, brackish or saline salt concentrations, and alkaline pH.

In select embodiments, processes are provided that make use of a culture of an organism found in soda lake environmens, such as *Spirulina*. In this context, we note that *Arthrospira plantensis* is the current genus/species name for the African cyanobacteria commonly used as a human food product. This organism was previously referred to as *Spirulina platensis*, but is now generally recognized as an *Arthrospira* species, distinct from the *Spirulina* genus. In common usage, in keeping with existing custom in the fields of foods and dietary supplements, many formulations designated commercially as *Spirulina* are actually *Arthrospira plantensis*.

Figure 1:
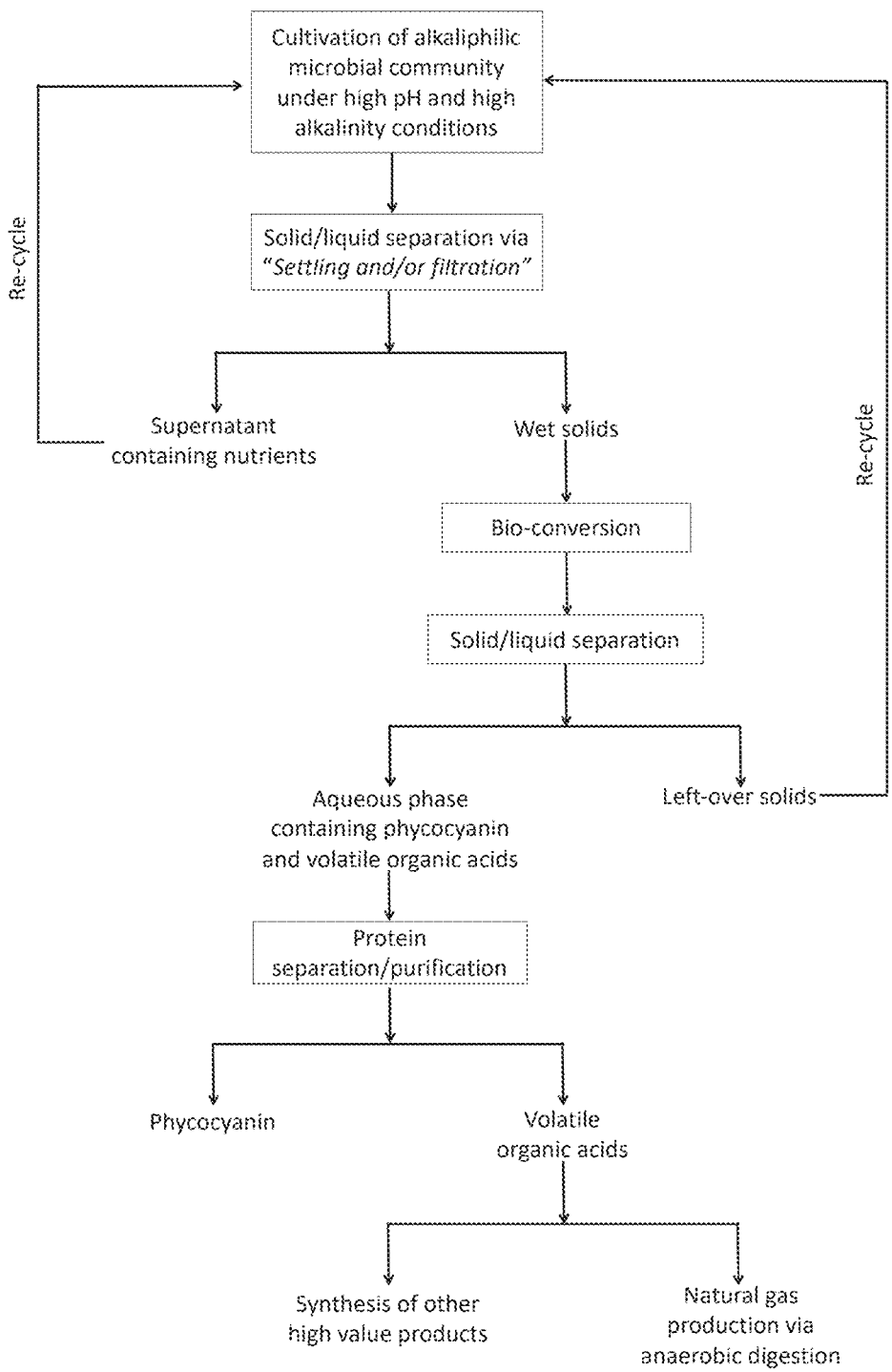
FIG. 1: is a schematic process flow diagram illustrating an example of a bio-conversion process, used to produce both phycocyanin and organic acids from a cyanobacterial consortium. The block flow diagram shows the process for extraction of phycocyanin and production of organic acids from cyanobacterial consortium. Carbon dioxide and digested solids obtained after bio-conversion process will be re-cycled back to cultivation process. Recovered organic acids may be used for either production of other chemicals or natural gas (via anaerobic digestion).

Methods are provided that facilitate extraction and purification of phycocyanin from wet biomass, and in addition result in production of organic acids that may for example be converted into high value chemicals or natural gas. Referring now to FIG. 1, a method is provided for a bio-conversion process to both extract phycocyanin and produce organic acids from cyanobacterial consortium. The block flow diagram in FIG. 1 shows a process wherein cyanobacterial consortium is first cultivated under high pH and high alkalinity growth conditions. The high pH and high alkalinity growth conditions facilitate efficient capture of carbon dioxide either from air or flue gas. The biomass produced is then concentrated via settling process. The spent medium obtained after this step is recycled back to cultivation system. The concentrated biomass obtained is subjected to a dark-phase anaerobic bio-conversion process. During this process, biomass is for example incubated at room temperature (20° C.) under dark and anoxic conditions. This process is carried out so as to lead to cyanobacterial cell disruption and the concomitant release of phycocyanin. In addition, this process would results in conversion of carbohydrates (storage compound in cyanobacteria) into organic acids. Following the bio-conversion process, the extract containing phycocyanin and organic acids may be separated from digested biomass. In selected embodiments, residual biomass (rich in nitrogen and phosphorous) and carbon dioxide, a bi-product, produced during the bio-conversion process may be recycled back to cultivation system. The extract is then subjected to a second separation step wherein phycocyanin is separated from organic acids. While phycocyanin can further be purified, organic acids are either converted into high value chemicals or used to produce natural gas via anaerobic digestion.

Figure 2:
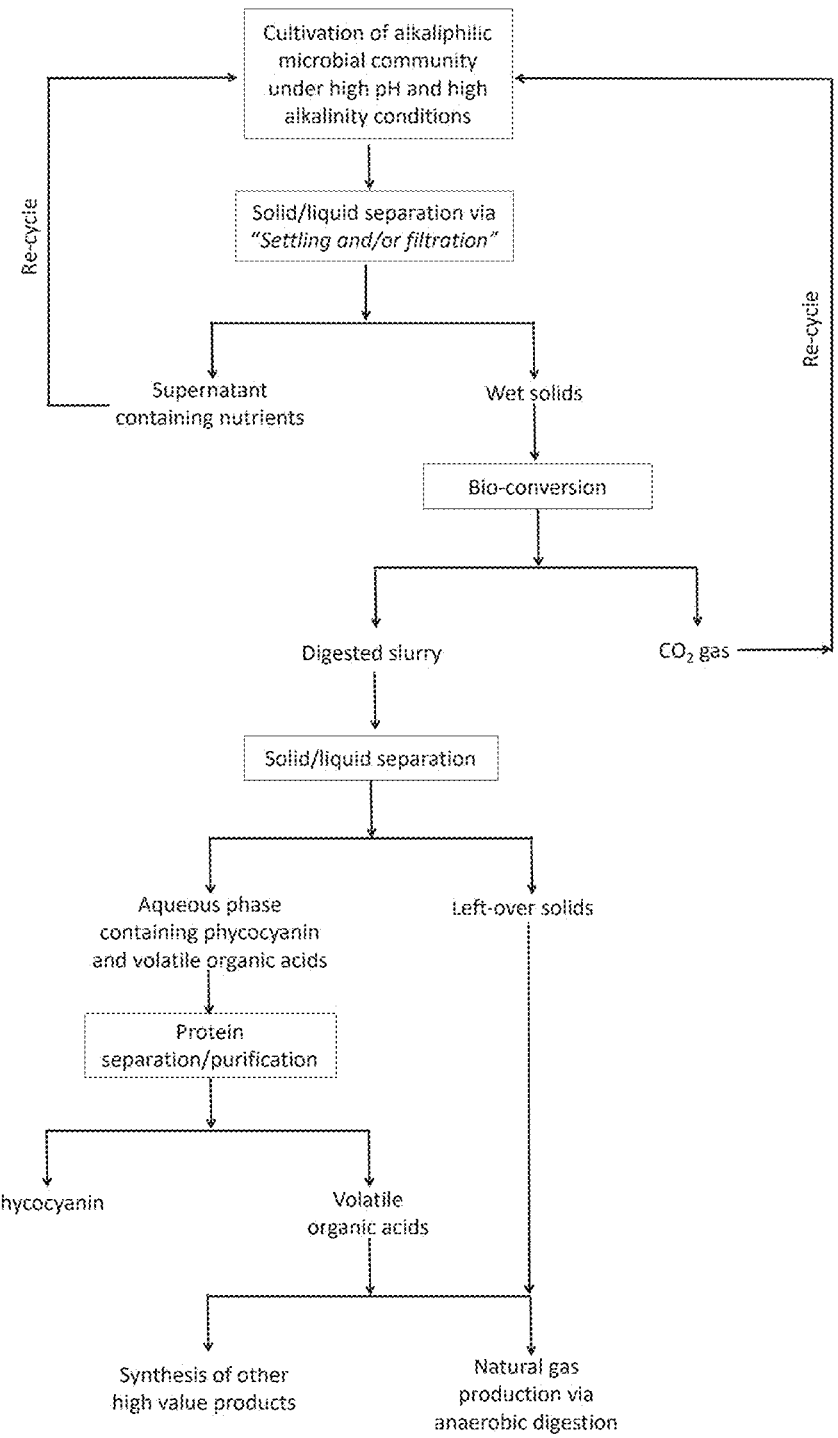
FIG. 2 is a schematic process flow diagram illustrating an example of a bio-conversion process used to produce both phycocyanin and organic acids from a cyanobacterial consortium. The block flow diagram shows the process for extraction of phycocyanin and production of organic acids from cyanobacterial consortium. Carbon dioxide obtained after bio-conversion process will be re-cycled back to cultivation process Recovered digested solids and organic acids may be used for the production of natural gas (via anaerobic digestion).

Referring now to FIG. 2, a method is provided for a bio-conversion process to both extract phycocyanin and produce organic acids from the cyanobacterial consortium. In the FIG. 2 embodiment, the digested solids (rich in nitrogen and phosphorous) obtained after the bio-conversion process will be supplied to anaerobic digestion to enhance the natural gas production.

Figure 3:
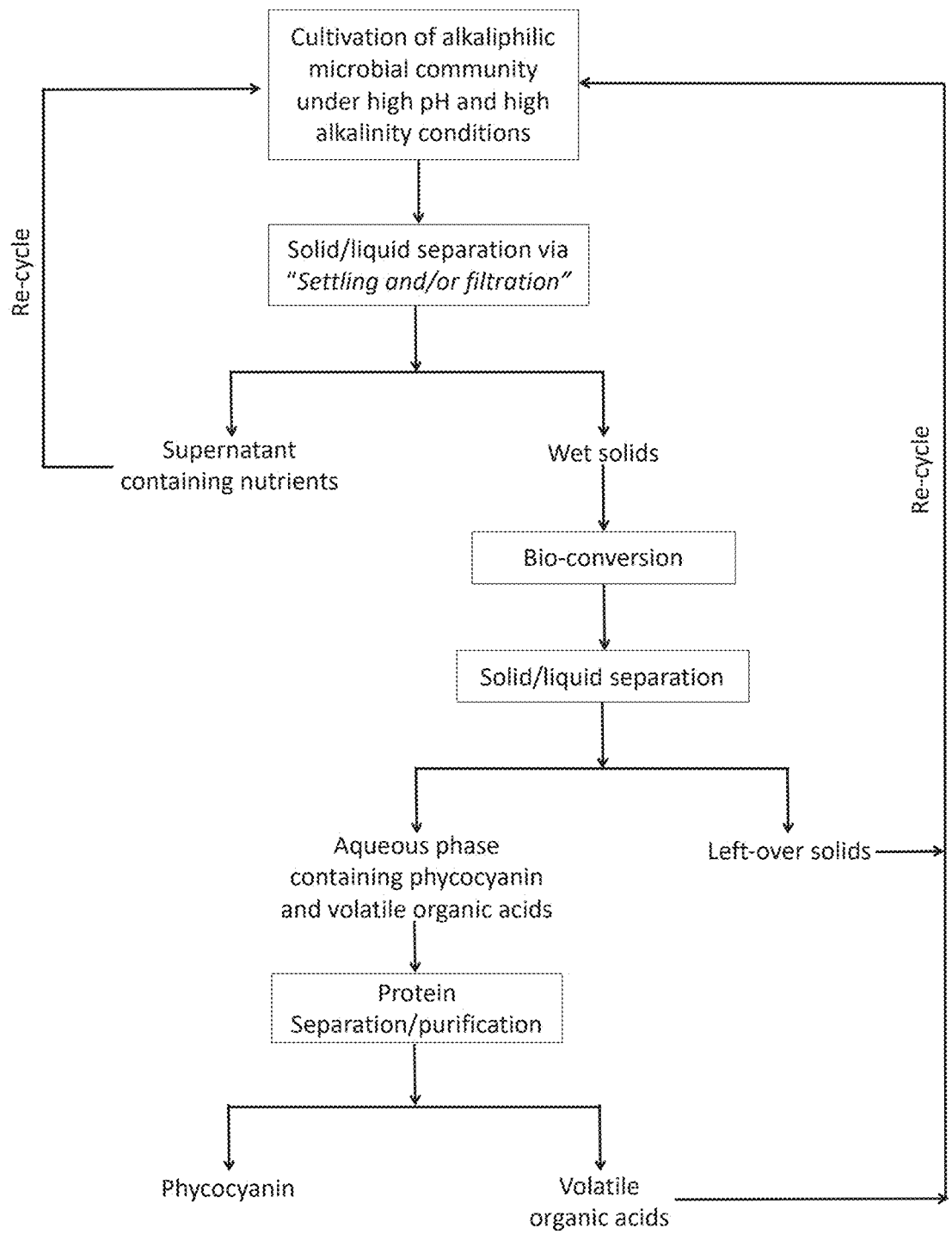
FIG. 3 is a schematic process flow diagram illustrating an example of a bio-conversion process used to produce both phycocyanin and organic acids from a cyanobacterial consortium. The block flow diagram shows the process for extraction of phycocyanin and production of organic acids from cyanobacterial consortium. Recovered carbon dioxide, digested solids and organic acids will be re-cycled back to cultivation process.

Referring now to FIG. 3, a method is provided for a bio-conversion process to both extract phycocyanin and produce organic acids from the cyanobacterial consortium. In the FIG. 3 embodiment, carbon dioxide, digested solids (rich in nitrogen and phosphorous) and organic acids obtained after the bio-conversion process will be recycled back to cultivation system. In this way, organic carbon (provided in the form of organic acids) and organic nitrogen and phosphorous from digested solids may be used to enhance biomass yields.

EXAMPLES

Example 1: Digestion of Biomass During Bio-Conversion Process

Cyanobacterial consortium collected from Soda Lakes located on the Cariboo Plateau, British Columbia, Canada was used in these examples. Culture incubations were performed for 4 days at room temperature (20° C.) in 25 L glass carboys with a working volume of 20 L. The glass carboys were placed on shaker incubator and mixed at a speed of 300 rpm. Full spectrum led lights (Model T5H0; 6400K, Sunblaster Holdings ULC, Langley, BC, Canada) were used and a light intensity of 200 µmol. photons/m$^2$/s with a light:dark cycle of 16:8 hr was maintained. To simulate the high pH and alkalinity conditions of soda lakes, a synthetic medium is used in these experiments. The high pH and high alkalinity growth medium contained the following: $Na_2CO_3$ (210.98 mM), $NaHCO_3$ (77.85 mM), $NaNO_3$ (3.06 mM), $NH_4$ (0.92 mM), $KH_2PO_4$, (1.44 mM), $MgSO_4 \cdot 7H_2O$ (1 mM), $CaCl_2 \cdot 2H_2O$ (0.17 mM), NaCl (0.43 mM), KCl (6.04 mM) $FeCl_3 \cdot 6H_2O$ (0.04 mM) and 300 L of trace metal solution. The trace metal solution comprised—$H_3BO_3$ (9.7 mM), $MnCl_2 \cdot 4H_2O$ (1.26 mM), $ZnCl_2$ (0.15 mM), $CuCl_2 \cdot 2H_2O$ (0.11 mM), $Na_2MoO_4 \cdot 2H_2O$ (0.07 mM), $CoCl_2 \cdot 6H_2O$ (0.06 mM), $NiCl_2 \cdot 6H_2O$ (0.04 mM), KBr (0.08 mM). The biomass obtained after 4 days of incubation is subjected to "settling" process in order to concentrate the biomass.

To illustrate the effect of bio-conversion process on cyanobacterial consortium, 16 sacrificial samples containing 2 grams of concentrated biomass (20% (w/w)) were incubated at room temperature (20° C.) under dark and anoxic conditions. The process was carried out for 12 days and two sacrificial samples were removed on every alternate day and analyzed for cell integrity and biomass dry weight. In another set of experiments, a commercially available algae, *Arthrospira plantensis*, was purchased and incubated in dark and anoxic conditions as a control.

Figure 4:
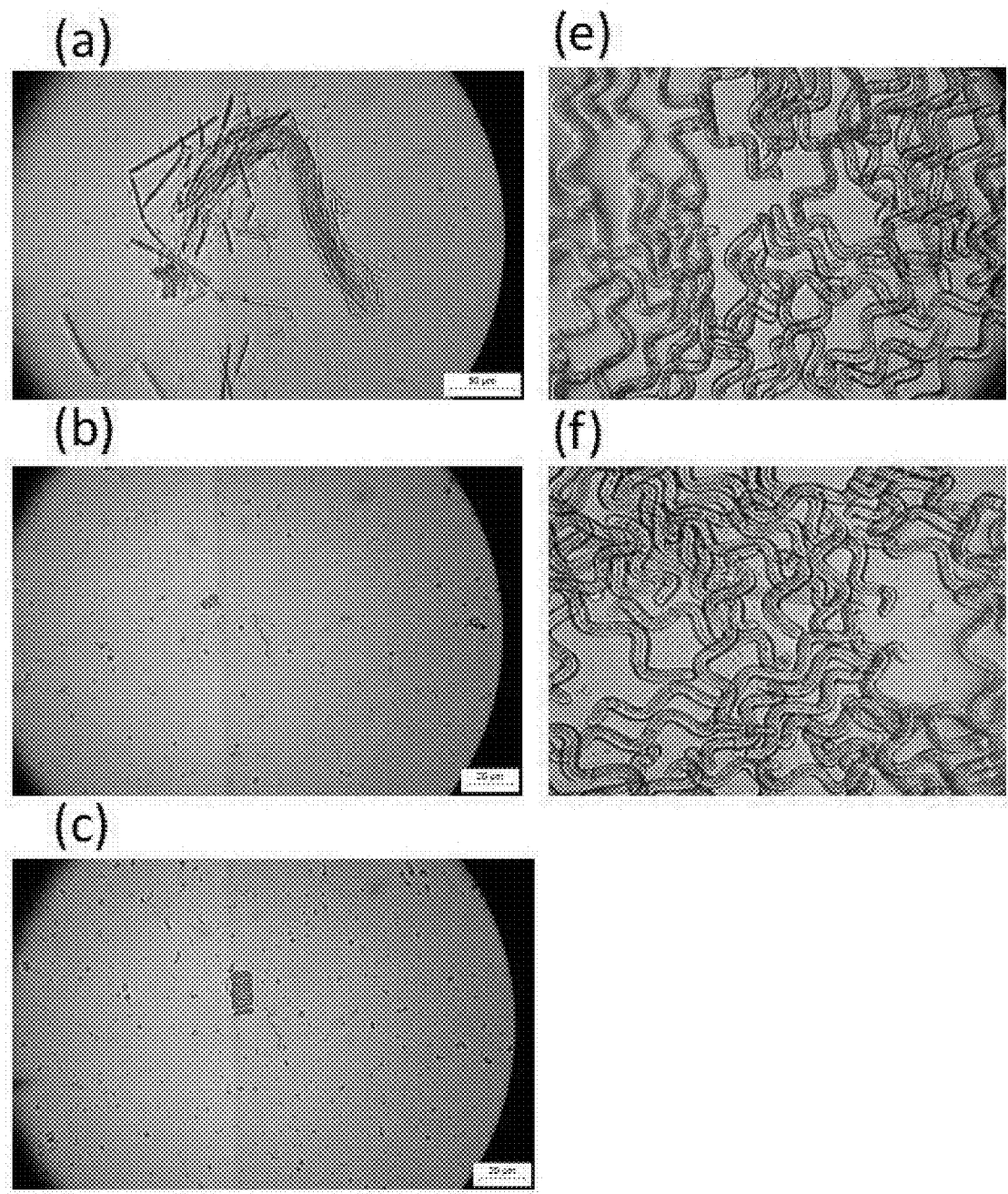
FIGS. 4 (a), (b) and (c) are microscopic images of a cyanobacterial consortium and (d) and (e) shows microscopic images of *Arthrospira plantensis* during the dark-phase incubation period.
Figure 5:
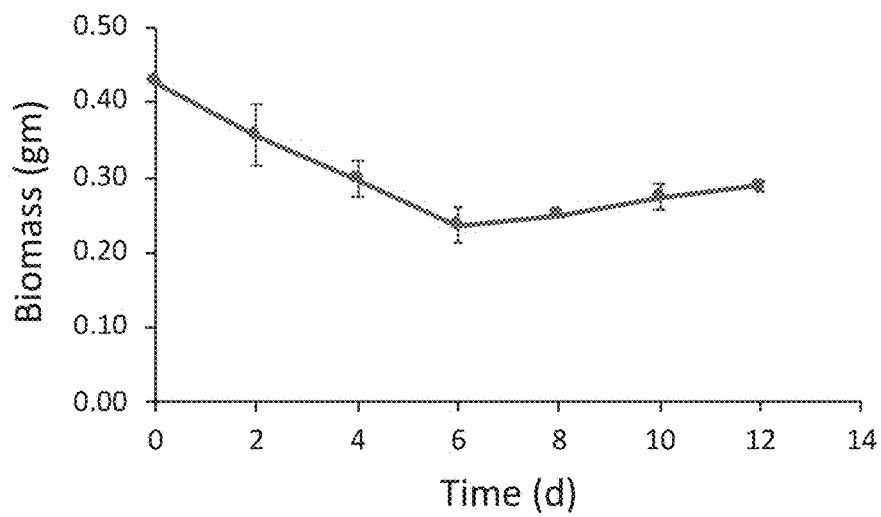
FIG. 5 is a graph illustrating a decrease in weight of the biomass during the dark-phase bio-conversion process.

FIG. 4 a, b, and c shows the microscopic images of sacrificial samples obtained on days 0, 6 and 8 respectively. It can be seen that cyanobacterial cells are intact on day 0. However, as the incubation time progressed (i.e. on days 6 and 8), the cell integrity was lost (see FIGS. 4b and c). This illustrates that the cyanobacterial consortium was digested during the bio-conversion process. Consistent with this, the dry weights of sacrificial samples decreased over the incubation time (See FIG. 5). In contrast, microscopic images of the control experiments reveal that the algae cells were still intact even after 8 days of incubation (see FIGS. 4d and e).

Figure 6:
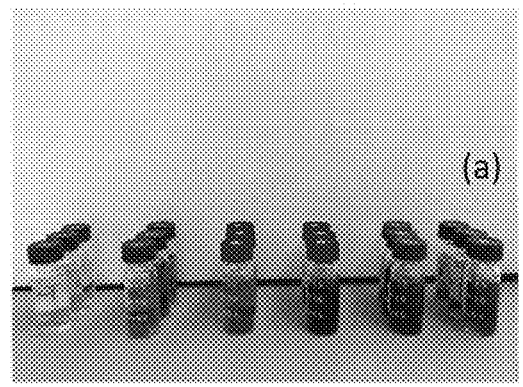
FIG. 6 includes a photograph showing the change in color of supernatant during the dark-phase incubation period; and, b) spectral data showing increase in the peak area at 620 nm and c) spectral data normalized to Day 0.
Figure 6:
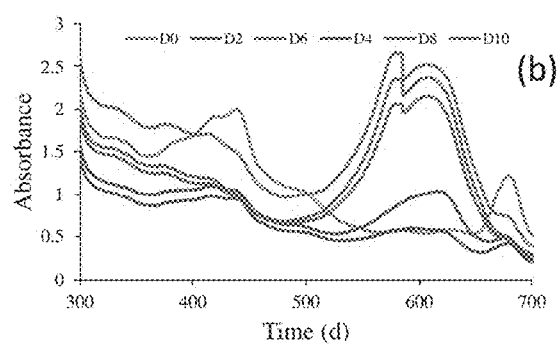
Figure 6:
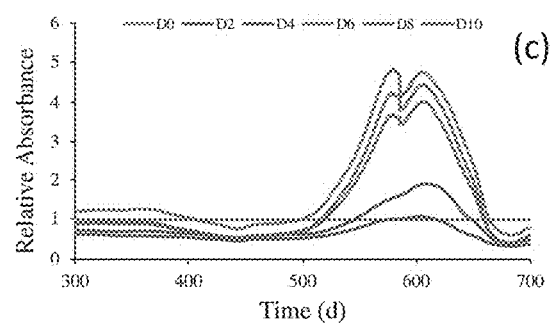

Example 2: Effect of Incubation Period on Extraction and Purification of Phycocyanin During Bio-Conversion Process For phycocyanin recovery and analysis, a 0.1 M phosphate buffer is used. 5 mL of 0.1 M phosphate buffer was added to the previously obtained sacrificial samples and vortexed for 10 min. The slurry was then centrifuged at 4000 rpm for 5 min to recover the extracted phycocyanin. As illustrated in grayscale in FIG. 6a, the color of the supernatant gradually changed from pale yellow to dark blue. This confirms that dark-phase incubation of concentrated biomass under anoxic conditions not only resulted in digestion of biomass but also resulted in phycocyanin release. Further evidence of this is available from spectroscopic data, based on the fact that for phycocyanin, a maximum absorbance is observed at a wavelength of 620 nm. When absorption spectra of phycocyanin was measured on a UV-Vis Spectrophotometer over a spectral range of 300-700, it was evident that the spectral absorbance is significantly high at a wavelength of 620 (see FIGS. 6b and c).

The mass and purity of phycocyanin released during the dark-phase bio-conversion process was also quantified. The absorption spectra of phycocyanin was measured on a UV-Vis Spectrophotometer at wavelengths 280 and 620. Mass of phycocyanin in the supernatant was estimated from a calibration curve generated by applying the same protocol as the samples to pure phycocyanin of known concentrations (obtained from Sigma Aldrich). And using the ratio of $A_{620}$ to $A_{280}$ purity of phycocyanin was determined.

Figure 7:
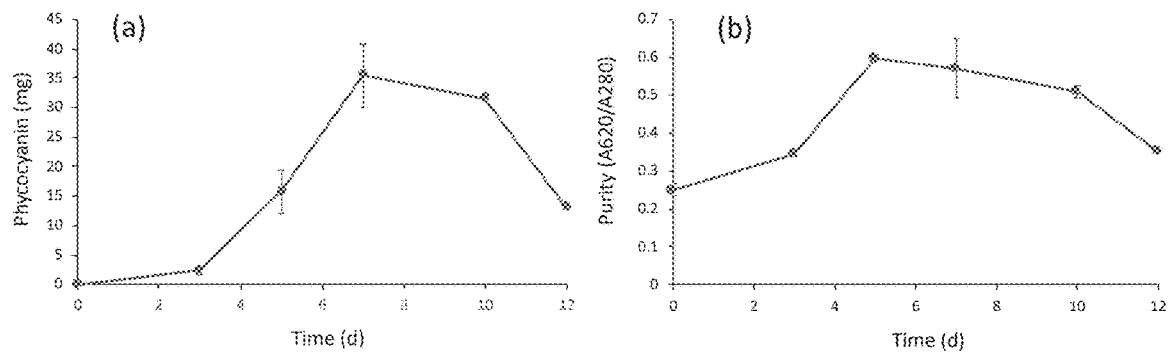
FIG. 7 includes graphs showing (a) Increase in the mass of phycocyanin and (b) purity of phycocyanin during a dark-phase bio-conversion process of biomass obtained from a 20 L bioreactor. The errors bars are obtained mean values of two replicates.

The results indicate that a maximum phycocyanin content of ~35 mg (~10% (w/w), see FIG. 7a) was obtained over a period of 6 to 8 days. Moreover, both the mass and purity increased up till day 8 after which they started to decline (see FIGS. 7a and b). In contrast, when similar analysis were carried out for control experiments, no phycocyanin release was observed.

Figure 8:
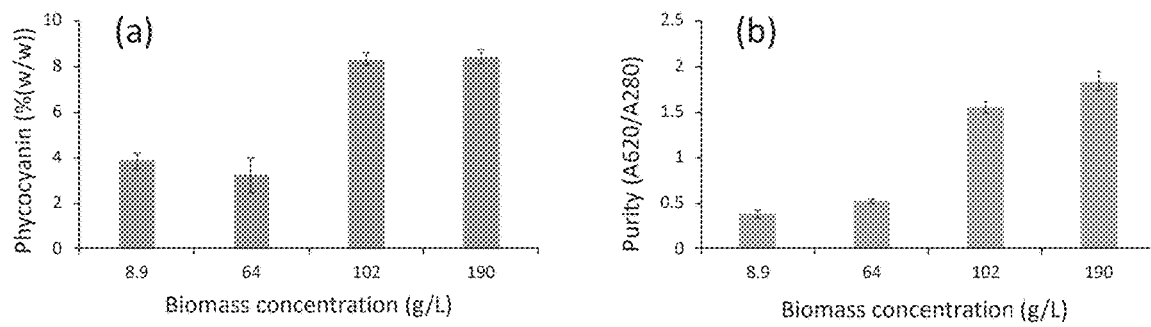
FIG. 8 includes two graphs illustrating an increase in both phycocyanin weight percentage (a) and purity (b) with increase in biomass concentration. The errors bars are obtained mean values of two replicates.

Example 3: Effect of Biomass Concentration on Phycocyanin Extraction and its Purity To illustrate the effect of biomass concentration on phycocyanin extraction and purity, four trial-scale processes were conducted with four different concentrations. Trial 1 with 19% (w/w) solids, trial 2 with 10% (w/w) solids, trial 3 with 6.4% (w/w) solids and trial 4 with 0.9% (w/w) solids. In each trial, 16 sacrificial samples were incubated under dark and anoxic conditions. In these trials, the volume of concentrated biomass is varied accordingly to maintain the same amount of biomass across all trials. The trails were carried out for 8 days and two sacrificial samples were removed from each trial on every alternate day and analyzed for phycocyanin content and purity. It was observed that for trial 1 and trial 2, phycocyanin content of 8.4% (w/w) was obtained (See FIG. 8a). It was also observed that the highest purity was achieved when the biomass concentrations were 19% (trial 1) and 10% (trial 2) (see FIG. 8b). In contrast, in trial 3 and trial 4, where the biomass concentrations were low, both phycocyanin content and purity were relatively low.

Figure 9:
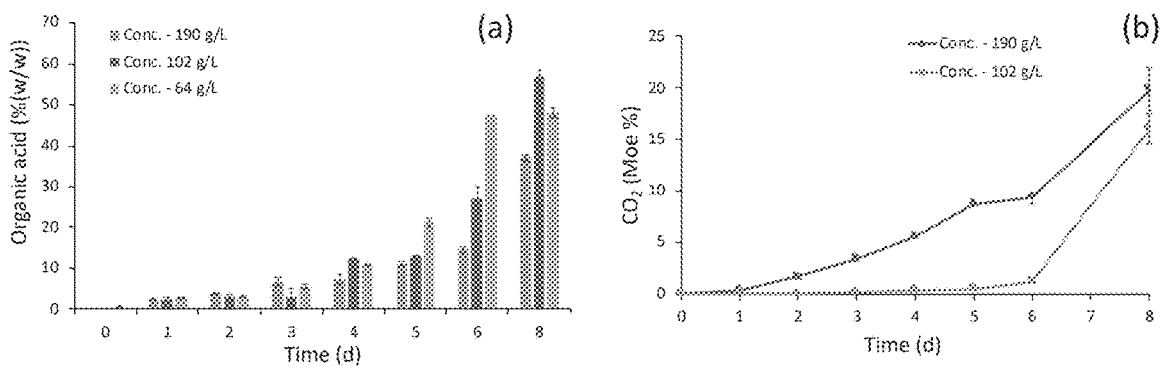
FIG. 9 includes graphs showing the increase in the organic acid concentration and (b) $CO_2$ release during the dark-phase bio-conversion of cyanobacterial consortium.

Example 4: Effect of Biomass Concentration on Organic Acid Production and Carbon Dioxide Release During Bio-Conversion Process For organic acid recovery and analysis, a 0.1 M phosphate buffer is used. 5 mL of 0.1 M phosphate buffer was added to the previously obtained sacrificial samples from all trials. The digested biomass in the sacrificial samples along with the phosphate buffer were vortexed for 10 min. The slurry was then centrifuged at 4000 rpm for 5 min to recover the produced organic acids. The recovered organic acids were first filtered through a 0.22 m membrane filter and then analyzed on HPLC equipped with Aminex HPX-87H column and a UV detector. The results show that the organic acid production for trial 2 (10% (w/w) solids) and trial 3 (6.4% (w/w) solids) were significantly higher when compared to trial 1 experiments (see FIG. 9a). Additionally, the head space gas was also analyzed using gas chromatography equipped with TCD and FID detectors. It was observed that there is no measurable carbon dioxide production in trial 3 and trial 4. In contrast, there was significant production of carbon dioxide in both trial 1 and trial 2 (~20 Mole %, see FIG. 9b).

Figure 10:
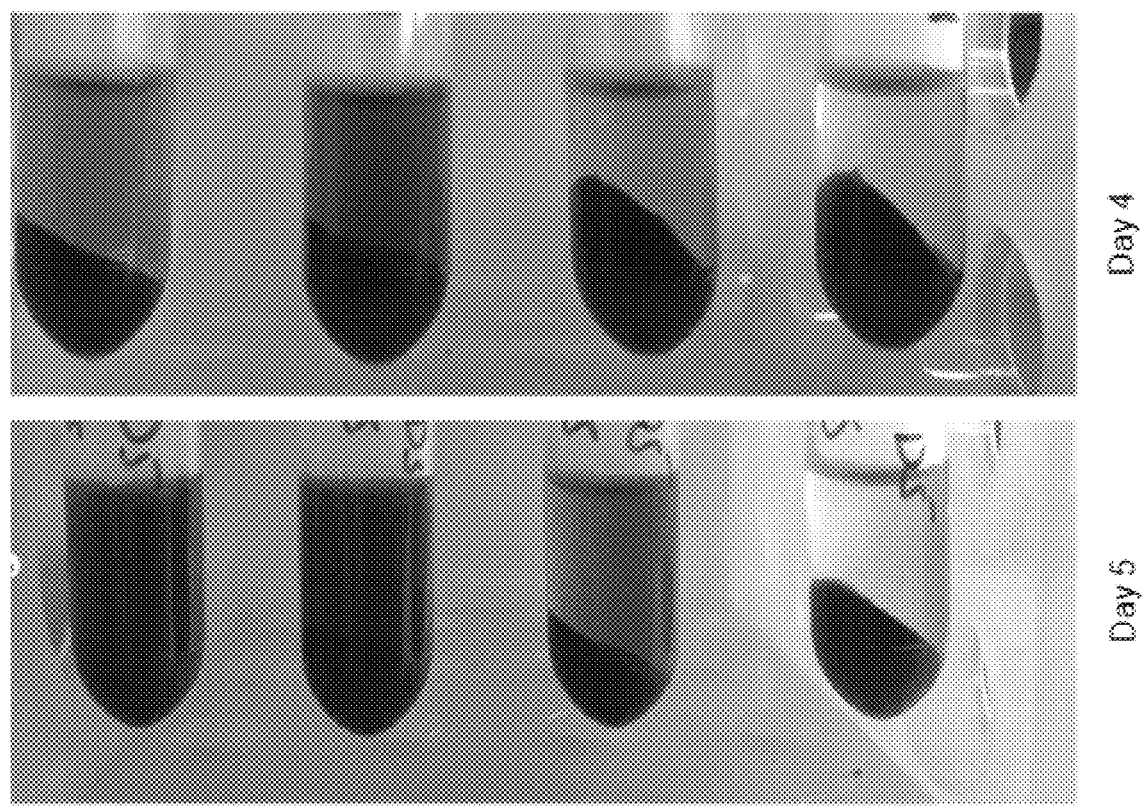
FIG. 10 is a photographic image showing the change in color of supernatant during the incubation period under varied Na+ concentrations. The supernatant obtained from trial 1 (Na+=1M) experiments has intense blue color compared to trial 2 (Na+=0.5M) and trial 3 (Na+=0.25M) experiments.

Example 5: Effect of $Na^+$ Concentration on Phycocyanin Release During the Bio-Conversion Process This example illustrates the effect of $Na^+$ concentrations in the growth medium on lysis of cyanobacterial cells during the dark-phase bio-conversion process. Three trials were conducted with varying $Na^+$ concentrations. Trial 1 with a $Na^+$ concentration of 1 M, trial 2 with a $Na^+$ concentration of 0.5 M, and trial 3 with 0.25 M $Na^+$ concentration. The trails were carried out for 10 days. Visual observations indicates that the phycocyanin release in trial 1 (see day 4 and day 5 samples of FIG. 10) was much faster compared to trail 2 and trial 3. This illustrates that the rate at which cyanobacterial cells are lysed was significantly higher under high $Na^+$ concentration (trial 1) compared to low $Na^+$ concentrations.

Example 6: Metagenomic Analysis 16 sacrificial samples containing 2 grams of concentrated biomass (20% (w/w)) were incubated at room temperature (20° C.) under dark and anoxic conditions. The trial was carried out for 12 days and two sacrificial samples were removed on every alternate day to carry out a metagenomic analysis.

Day 0-Day 4

Species C1 (*Phormidium*) remained the dominant community member (>60% relative abundance) throughout Day 2 and Day 4. During Day 2 and Day 4, species P1 and V3 remained the second and third most abundant species respectively (FIG. 11).

Day 6-Day 12

Figure 11:
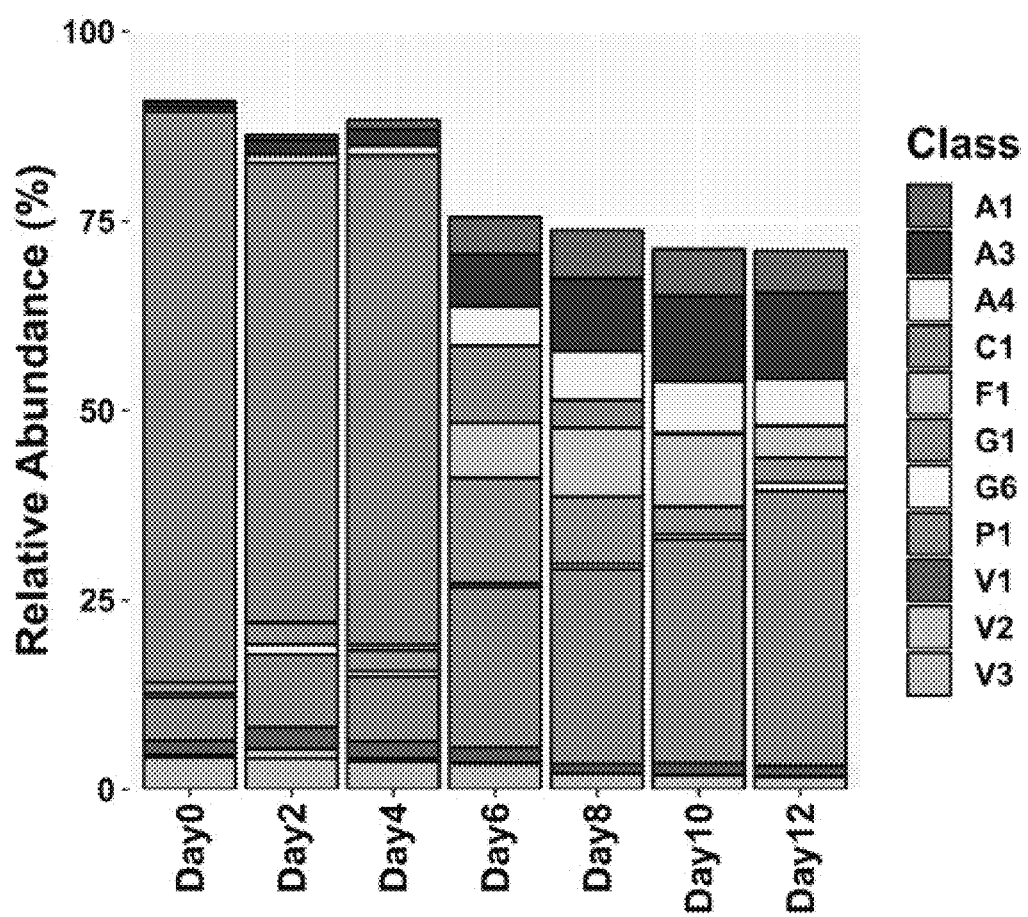
FIG. 11 is a stacked bar plot showing the community composition of the processed biomass throughout the course of a 12 day process. Bacterial species that contributed to at least 5% of the relative abundance in at least one sample during the time series experiment are included. Relative abundance is based on proportion of community DNA. Table 1: Shows the taxonomy of the species.

On Day 6, coinciding with the noticeable release in phycocyanin, there was a dramatic decrease of the *Phormidium* C1 population from 65% (Day 4) relative abundance to 10% relative abundance (Day 6, FIG. 11). The species P1 (*Planctomycetota*: SM1A02) increased from 8.5% (Day 4) to 21% (Day 6) relative abundance and became the most abundant species in the biomass with respect to DNA concentration. Species G1 (Proteobacteria: *Wenzhouxiangella*) increased in abundance to 14% on Day 6. Species F1 (Firmicutes: *Alkalibacterium*), A3 (Proteobacteria: Rhodobacteraceae), A4 (Proteobacteria: *Salinarimonas*), and A1 (Proteobacteria: Rhodobacteraceae), all increased on Day 6 to 5% relative abundance or greater.

From Day 8 to Day 12, C1 (Cyanobacteria: *Phormidium*) continued to decrease to less than 0.2% of the community DNA. Species P1 (*Planctomycetota*:SM1A02) continued to increase to 36% of the community relative abundance, and species A3 (Proteobacteria: Rhodobacteraceae), F1 (Firmicutes: *Alkalibacterium*), A4 (Proteobacteria: *Salinarimonas*), and A1 (Proteobacteria: Rhodobacteraceae) each persisted at between 5-10% of community relative abundance. Species G1 (Proteobacteria: *Wenzhouxiangella*), abundant on Day 6 (14%), decreased to less than 3.5% by Day 12.

Example 7: Effect of $Na^+$ Concentration on Phycocyanin Release During the Bio-Conversion Process of Commercially Available Algae, *Arthrospira plantensis*

This example illustrates the effect of $Na^+$ concentration on lysis of *Arthrospira plantensis* cells during a dark-phase bio-conversion process. In brief, 12 g of NaCl was added to 230 g of *Arthrospira plantensis* paste (~15% (w/w) dry weight) to bring overall concentration of $Na^+$ ions of the algae paste to 1M. Following the NaCl addition, the algae paste was incubated in dark for 15 days. Visual observations clearly indicate that phycocyanin was passively released (FIG. 12). On the contrary, when the same algae were incubated in dark without any addition of $Na^+$ ions, phycocyanin was not released and the cells were intact even after 8 days (FIG. 4e & f). This illustrates that high $Na^+$ concentrations during a dark incubation facilitates cell lysis and passive release of phycocyanin.

INCORPORATED REFERENCES

Boros E, Kolpakova M (2018) "A review of the defining chemical properties of soda lakes and pans: An assessment on a large geographic scale of Eurasian inland saline surface waters." PLoS ONE 13(8): e0202205.

Foulds and Carr (1977) "A Proteolytic Enzyme Degrading Phycocyanin in the Cyanobacterium *Anabaena cylindrica*" FEMS Microbiology Letters 2: 117-119.

Kuddus M, Singh P, Thomas G, Al-Hazimi A (2013). "Recent developments in production and biotechnological applications of C-phycocyanin". BioMed Research International. 2013.

Pagels, Guedes, Amaro, Kijjoa, Vasconcelos (2019) "Phycobiliproteins from cyanobacteria: Chemistry and biotechnological applications.".Biotechnol Adv. 2019 May-June; 37(3):422-443. Epub 2019 Feb. 21.

Sorokin, Gijs Kuenen (2005) "Chemolithotrophic haloalkaliphiles from soda lakes" FEMS Microbiology Ecology, Volume 52, Issue 3, May 2005, Pages 287-295.

Zorz, Sharp, Kleiner, Gordon, Pon, Dong & Strous (2019) "A shared core microbiome in soda lakes separated by large distances" Nature Communications 10:4230.

Citation of references herein is not an admission that such references are prior art to the present invention. Any priority document(s) and all publications, including but not limited to patents and patent applications, cited in this specification, and all documents cited in such documents and publications, are hereby incorporated herein by reference as if each individual publication were specifically and individually indicated to be incorporated by reference herein and as though fully set forth herein. The invention includes all embodiments and variations substantially as hereinbefore described and with reference to the examples and drawings.

Although various embodiments of the invention are disclosed herein, many adaptations and modifications may be made within the scope of the invention in accordance with the common general knowledge of those skilled in this art. Such modifications include the substitution of known equivalents for any aspect of the invention in order to achieve the same result in substantially the same way. Terms such as "exemplary" or "exemplified" are used herein to mean "serving as an example, instance, or illustration." Any implementation described herein as "exemplary" or "exemplified" is accordingly not to be construed as necessarily preferred or advantageous over other implementations, all such implementations being independent embodiments. Unless otherwise stated, numeric ranges are inclusive of the numbers defining the range, and numbers are necessarily approximations to the given decimal. The word "comprising" is used herein as an open-ended term, substantially equivalent to the phrase "including, but not limited to", and the word "comprises" has a corresponding meaning. As used herein, the singular forms "a", "an" and "the" include plural referents unless the context clearly dictates otherwise. Thus, for example, reference to "a thing" includes more than one such thing.

The invention claimed is:

1. A method of making a phycocyanin product, comprising:
    culturing an alkaliphilic soda lake microbial consortium under aerobic alkaline conditions in a diurnal growth cycle to establish a cyanobacterial population containing the phycocyanin within the microbial consortium in a cultured biomass in an aerobic culture comprising a growth medium comprising from 0.25-3M $Na^+$; and,
    shifting the microbial consortium, having a proportion of cyanobacteria and a proportion of non-cyanobacterial alkaliphile microbes, to a dark-phase cycle under anaerobic alkaline conditions in an anaerobic culture comprising from 0.25-3M $Na^+$ to initiate auto-catabolic release of the phycocyanin intact from the cyanobacterial population as the proportion of cyanobacteria in the microbial consortium decreases and the proportion of non-cyanobacterial alkaliphile microbes increases in the consortium, to produce a biomass solids product and an aqueous phycocyanin product.

2. The method of claim 1, wherein the aerobic and/or anaerobic alkaline conditions comprise at least 0.5M Na+.

3. The method of claim 1, wherein the aerobic and/or anaerobic alkaline conditions comprise:
    at least 0.5M total carbonate alkalinity $CO_3^{2-}+HCO^{3-}$, or from about 0.25M to about 1M total carbonate alkalinity $CO_3^{2-}+HCO^{3-}$; and/or,
    a pH of at least 9, or a pH of from about 7 to about 11; and/or,
    one or more dissolved species that are: $Na_2CO_3$, $NaHCO_3$, $NaNO_3$, $NH_4$, $KH_2PO_4$, $MgSO_4 \cdot 7H_2O$, $CaCl_2 \cdot 2H_2O$, NaCl, KCl, $FeCl_3 \cdot 6H_2O$, $H_3BO_3$, $MnCl_2 \cdot 4H_2O$, $ZnCl_2$, $CuCl_2 \cdot 2H_2O$, $Na_2MoO_4 \cdot 2H_2O$, $CoCl_2 \cdot 6H_2O$, $NiCl_2 \cdot 6H_2O$, and/or KBr; and/or,
    a temperature of from about 10° C. to about 30° C., or from about 4° C. to about 45° C.

4. The method of claim 1, wherein the aerobic alkaline conditions comprise:
    an oxygen partial pressure of at least 200 mbar or at least 9 mg/L; and/or,
    exposure to air;
    wherein the anaerobic alkaline conditions comprise:
    an oxygen partial pressure of less than 100, 90, 80, 70, 60, 50, 40, 30, 20 or 10 mbar or less than 4, 3, 2, 1, 0.5, or 0.1 mg/L; and/or,
    exclusion of air.

5. The method of claim 1, wherein:
    the diurnal cycle is maintained for a light phase incubation time that is at least 1, 2, 3, 4, 5 or 6 days; and/or,
    the dark phase cycle is maintained for a dark phase incubation time that is at least 1, 2, 3, 4, 5, 6, 7, 8, 9, 10 or 11 days, or from 1-12 days; and/or,
    the diurnal cycle comprises exposure of the microbial consortium to full spectrum sunlight or artificial light that covers a visible spectrum range.

6. The method of claim 1, further comprising allowing the cultured biomass to either settle or float prior to shifting the microbial consortium to the dark-phase cycle to provide a concentrated biomass for the dark-phase cycle, wherein the concentrated biomass has a concentration of at least 10, 11, 12, 13, 14, 15, 16, 17, 18 or 19% in the anaerobic culture, biomass solid weight/total anaerobic culture weight, under the anaerobic alkaline conditions.

7. The method of claim 1, wherein the microbial consortium comprises:
    a *Phormidium*; and/or,
    a *Planctomycetota*; and/or,
    an *Arthrospira* sp.

8. The method of claim 1, wherein the microbial consortium comprises a plurality of organisms selected from the group consisting of:
    *Nodosilinea, Gloeocapsa, Phonnidium, Arthrospira, Spriulina*, Rhodobacteraceae, Gemmatimonadota belonging to order SG8-23, Chromatiaceae, *Natronohydrobacter*, Geminicoccales, *Nodosilinea, Cyanobium, Wenzhouxiangella, Indibacter*, Competibacteraceae, Nitriliruptoraceae, *Desulfonatronum*, Thioalkalivibrionaceae, *Roseinatronobacter, Natronohydrobacter*, Rhodobacteraceae, *Salinarimonas*, Geminicoccales, Rhodospirillales, Micavibrionales, *Wenzhouxiangella*, Thioalkalivibrionaceae, *Ectothiorhodospira*, Gammaproteobacteria, *Thiohalocapsa*, Competibacteraceae, *Halomonas, Nitrincola*, Pseudomonadales, *Pseudomonas*, Hahellaceae, *Desulfonatronum*, Bdellovibrionota belonging to the family UBA2394, Myxococcota belonging to the family CA-2862545, Myxococcota belonging to the order UBA4248, Bacteroidales belonging to the family UBA7960, Bacteroidales belonging to the family UBA12077, Saprospiraceae, Chitinophagales belonging to the family UBA2359, Flavobacteriales, *Schleiferia, Indibacter*, Balneolaceae belonging to the genus UBA2664, Balneolaceae, Balneolales, *Alkalispirochaeta*, Alkalispirochaetaceae, Spirochaetales, Pirellulaceae belonging to the genus UBA6163, Pirellulaceae, Phycisphaerales of the family SM1A02, Phycisphaerales belonging to the family SM1A02, *Planctomycetota* belonging to the family UBA11346, Opitutaceae, Puniceicoccaceae belonging to the genus BACL24, *Nitrolancea*, Anaerolineae belonging to the genus GCA-2794505, Ilumatobacteraceae, Nitriliruptoraceae, Trueperaceae, Acholeplasmataceae, Izimaplasmataceae, *Alkalibacterium, Bacillus, Nodosilinea*, Phormidesmiaceae, *Arthrospira platensis, Phormidium, Nodularia, Cyanobium, Gloeocapsa, Spirulina*, Gemmatimonadota belonging to the order SG8-23, *Nodosilinea*, or any combination thereof.

9. The method of claim 1, wherein the yield of the phycocyanin product is at least 0.5, 1, 1.5, 2, 3, 4, 5, 6, 7, 8, 9, or 10 wt % of the biomass solids product yield.

10. The method of claim 1, wherein $CO_2$ produced during auto-catabolic release of the phycocyanin is captured and utilized as an inorganic carbon source for culturing the alkaliphilic soda lake microbial consortium.

11. The method of claim 1, wherein a residual solids fraction is collected after auto-catabolic release of the phycocyanin and at least a portion of the residual solids fraction is re-cycled back to the step of culturing the alkaliphilic soda lake microbial consortium.

12. The method of claim 1, wherein organic acids produced during the auto-catabolic release of the phycocyanin are separated from the phycocyanin product.

13. The method of claim 5, wherein the diurnal cycle comprises exposure of the microbial consortium to full spectrum sunlight or artificial light that covers a visible spectrum range at a light intensity of at least 200 μmol. photons/$m^2$/s with a light:dark cycle of approximately 16:8 hr, or wherein the diurnal cycle is from about 9 to about 16 hr and the dark phase cycle is from about 8 to about 15 hr.

14. The method of claim 1, further comprising separating the cultured biomass from the growth medium by a filtration to provide a concentrated biomass, wherein the concentrated biomass has a concentration of at least 10, 11, 12, 13, 14, 15, 16, 17, 18 or 19% in the anaerobic culture, biomass solid weight/total anaerobic culture weight, under the anaerobic alkaline conditions.

15. The method of claim 14, wherein the filtration comprises filtration with a filter of from about 100 to about 635 mesh.

16. The method of claim 1, wherein the microbial consortium comprises *Arthrospira plantensis*.

17. The method of claim 11, wherein at least a portion of the residual solids fraction is directed to a microbial process to produce methane.

18. The method of claim 12, wherein the organic acids separated from the phycocyanin product are collected to provide collected organic acids, and wherein the collected organic acids are directed for use in culturing the alkaliphilic soda lake microbial consortium mixotrophically.

19. The method of claim 12, wherein the organic acids are separated from the phycocyanin product by an organic acid filtration, and the organic acid filtration comprises filtration with a molecular weight cut-off filter in a range of 10-30 kDa.

* * * * *